United States Patent [19]
Iwakami

[11] 3,904,992
[45] Sept. 9, 1975

[54] TWO-PORT NETWORK FOR SIGNAL TRANSMISSION EQUALIZATION

[75] Inventor: Takuya Iwakami, Tokyo, Japan

[73] Assignee: Nippon Electric Company, Limited, Tokyo, Japan

[22] Filed: Feb. 8, 1974

[21] Appl. No.: 440,903

[30] Foreign Application Priority Data

Feb. 12, 1973 Japan .............................. 48-17761

[52] U.S. Cl. .................... 333/18; 333/23; 333/28 R; 333/29; 333/70 CR

[51] Int. Cl.$^{2}$.. H03H 7/10; H03H 7/14; H03H 7/30; H04B 3/04

[58] Field of Search ......... 333/70 CR, 23, 18, 28 R, 333/29, 17, 70 R; 330/31, 26, 94, 109, 107, 21; 307/320

[56] References Cited

UNITED STATES PATENTS

| | | | |
|---|---|---|---|
| 3,022,472 | 2/1962 | Tanenbaum et al. | 307/320 X |
| 3,436,668 | 4/1969 | Russell | 330/21 |
| 3,605,032 | 9/1971 | Kerwin | 330/21 X |
| 3,748,499 | 7/1973 | Schaffner | 333/29 UX |

OTHER PUBLICATIONS

Smith et al., "Printed Distributed R–C Networks," in Electrical Manufacturing Nov. 1956, pp. 121–125 and 352.

*Primary Examiner*—James W. Lawrence
*Assistant Examiner*—Marvin Nussbaum
*Attorney, Agent, or Firm*—Sughrue, Rothwell, Mion, Zinn & Macpeak

[57] ABSTRACT

A two-port network for use in transmission line equalizers in repeatered wide-band communication systems is disclosed. The network includes a single one-port uniformly-distributed RC network connected between corresponding terminals of the input and output ports. A capacitance element is connected between the terminals of the output port. The two-port network is adapted to integrated circuit construction and may be cascaded through buffer amplifiers. Alternatively, the two-port network may form a part of a feedback equalizer. In one embodiment, the capacitance element is a variable-capacitance diode controlled by a peak detector. In another embodiment, the two-port network is used as the feedback circuit.

6 Claims, 10 Drawing Figures

TWO-PORT NETWORK FOR SIGNAL TRANSMISSION EQUALIZATION

BACKGROUND OF THE INVENTION

1. Field of the Invention

The present invention relates to a two-port network for use in a repeater for a wide-band repeatered coaxial line communication system as dummy transmission lines or constituents of variable or fixed line equalizers.

2. Description of the Prior Art

A coaxial cable used as a transmission medium for a communication system has a voltage transfer function C(S), which is given at frequencies above several tens of kilohertz by:

$$C(S) = e^{-\alpha \quad \alpha\sqrt{s}\ l} \qquad (1)$$

where $S = j\omega; j^2 = -1; e = 2.7183$ (the base of the natural logarithm); $\omega$; the angular frequency; $\alpha$, a constant substantially determined by the material and structure of the cable; and $l$, the length of the cable. In order to transmit waveforms without distortion in the repeatered communication system, therefore, the line equalization for compensating for the transmission characteristic of Eq. (1) must be made at each repeater. The cable length depends on the spacing between every two adjacent repeaters, and is not always precisely constant because of the geographical and other restrictions imposed on building the repeaters. In addition, the constant $\alpha$ is subjected to an appreciable change with the ambient temperature variation, which causes effects equivalent to shortening and lengthening of the cables.

In the repeatered coaxial line communication system, it is therefore necessary to suitably insert coaxial line equalizers at each of the repeaters or at least at some of the repeaters. Each of the coaxial line equalizers comprises: (i) a fixed equalizer so designed as to compensate for the cable characteristic at a fixed standard repeating distance; (ii) a set of dummy cables providing several equivalent cable lengths for electrically equalizing the transmission lines for various repeater spacings; and (iii) a variable line equalizer of a sloped AGC type, for compensating for the non-uniformity of the lengths of the cables and for cancelling the shortening or lengthening effect on the coaxial cables depending on the temperature change.

Uniformly distributed RC network type equalizers have been in general and extensive use as the fixed equalizer (1) and as the dummy cables (ii), while the Bode type equalizer has been used as the variable line equalizer (iii). Various modifications of these circuits are also in use. As regards these compensating circuits, further description will not be given here because they are described in detail in the U.S. Pat. Nos. 3,706,053 and 3,753,161 and in the technical paper entitled "Variable Equalizers" by H. W. Bode (B.S.T.J., Apr. 17, 1938, pp. 229–244, particularly p. 237). The conventional coaxial line equalizer is as a whole complicated and difficult to miniaturize. Furthermore, the variable line equalizer (iii) is easily affected by parasitic capacitance and inductance, and therefore it is difficult to broaden its transmission band. In addition, in order to obtain a sufficiently accurate approximation of characteristic by the coaxial line equalizer, the circuit arrangement becomes unavoidably complicated. Also, an equalizer usable as the variable line equalizer has been proposed as shown in my co-pending U.S. Pat. applications Ser. Nos. 313,054, now U.S. Pat. No. 3,789,326, and 314,302, now U.S. Pat. No. 3,806,839, filed Dec. 7 and Dec. 12, 1972, respectively.

SUMMARY OF THE INVENTION

An object of the present invention is therefore to provide a novel two-port network of a simplified circuit construction, which is for use as a dummy transmission line or as a constituent of a variable or fixed line equalizer.

The two-port network of the present invention comprises a single capacitance element and a single uniformly-distributed RC network. As compared with the conventional two-port networks, it is characterized in that the circuit arrangement is simple and easy to manufacture in the form of an integrated circuit and that the equivalent cable length of the network, when used as the dummy transmission line, can be easily varied by changing the value of the single capacitance element.

BRIEF DESCRIPTION OF THE DRAWINGS

The present invention will now be described in detail with reference to the accompanying drawings, wherein.

DESCRIPTION OF THE PREFERRED EMBODIMENTS

Figure 1:
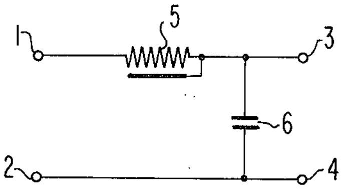
FIG. 1 shows a circuit diagram of a two-port network, which is a first, principal embodiment of the present invention.

Now referring to FIG. 1, reference numerals 1 and 2 denote the input port; 3 and 4, the output port; 5, a uniformly distributed RC network; and 6, a capacitor. The uniformly distributed RC network 5 has a distributed constant RC line in which the resistance and capacitance per unit length are uniformly distributed in the lengthwise direction. By way of example, it can be realized by a structure as shown in FIG. 2.

Figure 2:
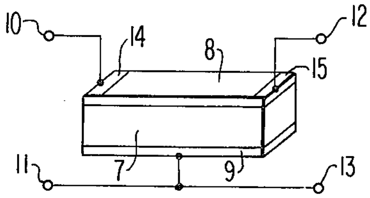
FIG. 2 shows a perspective view of a uniformly distributed RC network constituting the embodiment.

Referring to FIG. 2, a resistive layer 8 of a constant specific resistance is formed on one major surface of a dielectric plate 7 of a suitable width, thickness, and a uniform dielectric constant. A conductive layer 9 is similarly formed on the other major surface of the dielectric plate 7, while conductor strips 14 and 15 are disposed on the resistive layer 8. Lead terminals 10 and 12 are bonded to the conductor strips 14 and 15 respectively so as to provide a uniform current distribution in the vicinity of their bonded points. Terminals 11 and 13 are connected to the conductive layer 9. (For further details, reference is made to U.S. Pat. No. 3,706,053).

Figures 3A, 3B, 3C, 3D:
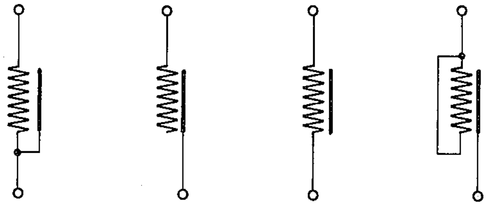
FIG. 3(*a*) through 3(*d*) show several modes of connection possible for the uniformly distributed RC network used as a one-port element.

As apparent from the structure in FIG. 2, the uniformly-distributed RC network is essentially a two-port element. Therefore, in order to use the element as a one-port element 5 of the arrangement shown in FIG. 1, four modes of connection are possible as shown in FIGS. 3(*a*) to 3(*d*). The impedances given by these modes of connection to the one-port element are as follows:

$$\text{FIG. 3 }(a)\text{:}\quad \sqrt{\frac{R_T}{C_T S}}\tanh\sqrt{R_T C_T S} \qquad (2)$$

$$\text{FIG. 3 }(b)\text{:}\quad \sqrt{\frac{R_T}{C_T S}}\coth\sqrt{R_T C_T S} \qquad (3)$$

$$\text{FIG. 3 }(c)\text{:}\quad \sqrt{\frac{4R_T}{C_T S}}\tanh\sqrt{\frac{R_T C_T S}{4}} \qquad (4)$$

$$\text{FIG. 3 }(d)\text{:}\quad \sqrt{\frac{R_T}{4C_T S}}\coth\sqrt{\frac{R_T C_T S}{4}} \qquad (5)$$

where $R_T$ and $C_T$ are the overall resistance and capacitance of the distributed RC network, respectively. Now if $$\omega_c = 1/(R_T C_T) \qquad (6)$$

and $\omega >> \omega_c$, we have $$\tanh\sqrt{R_T C_T \cdot j\omega} \simeq 1 \qquad (7)$$

$$\coth\sqrt{R_T C_T \cdot j\omega} \simeq 1 \qquad (8)$$

More definitely, the errors of Eqs. (7) and (8) are only within ±1 percent for $\omega$ 10 $\omega_c$ and within ±10% even for $\omega \geqq \omega_c$. Under such conditions, Eqs. (2) and (3) can be put as being approximately equal to $\sqrt{R_T/(C_T S)}$. Quite similarly, at $\omega >> 4\omega_c$, Eqs. (4) and (5) are approximately equal to $\sqrt{4R_T/(C_T S)}$ and $\sqrt{R_T/(4C_T S)}$ respectively.

If, in FIG. 3 (*c*), the length of the distributed RC network is halved and the width is doubled, the total resistance will become ¼ while the total capacity remains unchanged. Therefore, the impedance becomes $\sqrt{R_T/(C_T S)}$ ($\omega >> 4\omega_c$). This is the same value as the impedance for the case where the terminals with the original dimensions are connected as shown in FIG. 3 (*a*) or 3 (*b*). In this manner, by appropriately setting the values of the distributed constants, all the distrinuted RC networks in FIG. 3 (*a*) – 3 (*d*) can be given the same impedance value at frequencies above the certain value. For this reason, the one-port impedances Z(S) of the distributed RC network are hereinbelow represented by that of the structure in FIG. 3 (*a*). That is:

$$Z(S) \simeq \sqrt{\frac{R_T}{C_T S}} \qquad (9)$$

The angular frequency range in which the approximation of Eq. (9) holds very precisely is given by:

$$\omega >> \omega_c = 1/(R_T C_T) \qquad (10)$$

When, in the two-port network shown in FIG. 1, the capacitance of the capacitor 6 is denoted by C and the impedance of the uniformly distributed RC network 5 is expressed by Eq. (9), the voltage transfer function T(S) of the two-port network becomes:

$$T(S) \simeq \frac{1/(SC)}{1/(SC) + \sqrt{R_T/(C_T S)}} = \frac{1}{1+\sqrt{(R_T C^2/C_T)S}} \qquad (11)$$

Here, introducing a symbol $\omega_o$ given by $$\omega_o = R_T C^2/C_T \qquad (12)$$

then the amplitude characteristic of Eq. (11) as indicated in decibels is as follows $$20\log_{10}|T(j\omega)| \approx -20\log_{10}|1+\sqrt{j(\omega/\omega_o)}|\,(\text{dB}) \qquad (13)$$

while, the amplitude characteristic of the coaxial cable expressed in decibels is introduced from Eq. (1):

$$20\log_{10}|C(j\omega)| = -20\alpha l\log_{10}e\,\sqrt{\omega} = -k\,\sqrt{\omega}(\text{dB}) \qquad (14)$$

$$\text{where } k = 20\alpha l\log_{10}e \qquad (15)$$

Figure 4:
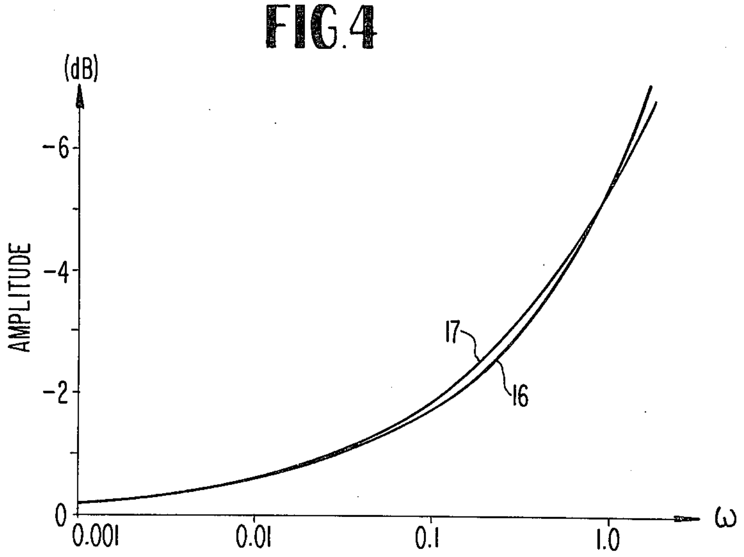
FIG. 4 shows characteristic curves showing the effects of the present invention.

It is found that the approximation error of Eq. (13) to Eq. (14) is very small. For example, a curve 16 in FIG. 4 indicates the characteristic of Eq. (14) at $k = 5.5$, while a curve 17 in the same figure indicates the characteristic of Eq. (13) at $\omega_o = 1$. The approximation error is only ±0.17 dB at the maximum, for:

$$0 < \omega \leqq 1 \qquad (16)$$

When the value of $k$ is smaller than 5.5, the error can be further diminished. By way of example, $\omega_o$ is made 3.0 for $k = 3.3$, whereby the error for $0 < \omega \leqq 1$ can be restrained to ±0.10 dB.

The equivalent cable length of the network, when used as the dummy transmission line, can be easily varied by changing the value of the capacitor 6. The variable range of the capacitance 6 depends on the value of the coefficient $k$ inherent to the coaxial cable to be equalized. For example, when the amplitude characteristic of the coaxial cable under the condition $0 < k \leqq 5.5$ must be equalized in the band-width $0 < \omega \leqq 1$, $\omega_o$ in Eq. (13) can be changed in the range from 1 to infinity, and hence the variable range of the capacitance value C of the capacitor 6 is given by $0 < C \leqq \sqrt{C_T/R_T}$. The approximation error in this case ranges between ±0.17 dB in the band-width $0 < \omega \leqq 1$, and becomes maximum when $k$ is equal to 5.5.

In this manner, the two-port network in FIG. 1 can be used as the coaxial cable with the coefficient $k$ below 5 – 6, with sufficient approximated accuracy (this cable corresponds to, for example, the 9.5 mm standard coaxial cable with the length of 100 – 120 m, used at 400 MHz). The lower-limit angular frequency of the band-width given by Eq. (16) is actually restricted to the lower-limit angular frequency $\omega_c$ given by Eq. (10). However, since the equations for determining the three values R, $R_T$ and $C_T$ of the equalizer are only two, that is, Eqs. (10) and (12), $R_T \times C_T$ can be arbitrarily increased to lower $\omega_c$, and the lower-limit frequency can be freely lowered.

Figure 5:
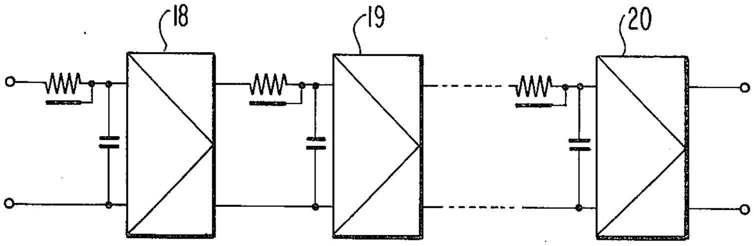
FIG. 5 shows a second embodiment of the present invention adapted to approximate the transmission characteristic of a long coaxial cable.

When the value of $k$ is greater than 5 – 6, several two-port networks as shown in FIG. 1 are connected in cascade, as shown in FIG. 5, through buffer amplifiers 18, 19, 20 etc. by the number of necessary stages to avoid the increase in the approximation error between Eqs. (13) and (14).

Figure 6:
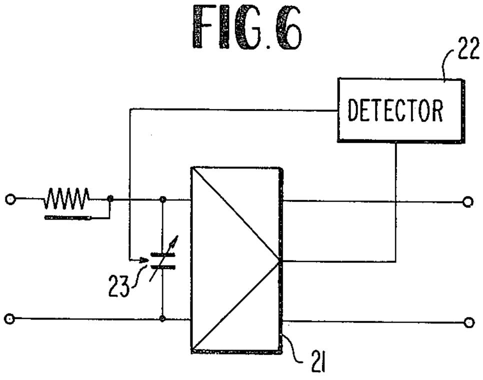
FIG. 6 shows a third embodiment of the present invention applied to a sloped AGC circuit.

FIG. 6 illustrates a third embodiment in which the two-port network of the present invention is used as the sloped AGC type variable line equalizer. In the figure, reference numeral 21 designates a buffer amplifier; 22, a detector circuit for detecting the peak value of the output of the amplifier 21; and 23, a variable capacitance element such as a variable-capacitance diode. By varying the capacitance C of the variable capacitance element 23 in response to the output of the detector circuit 22, the equivalent variation of the coaxial cable length is automatically equalized. This will be apparent from the foregoing explanation.

Figure 7:
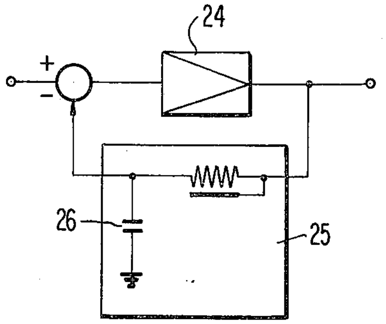
FIG. 7 shows a fourth embodiment of the present invention applied to a feedback type fixed line equalizer.

FIG. 7 illustrates a fourth embodiment in which the two-port network of the present invention is applied to the feedback type fixed line two-port network. The equalizer of the present invention is employed in a feedback circuit 25 of an amplifier 24 having gain A. The voltage transfer function E(S) of the circuit in FIG. 7 can be readily evaluated from the theory of the feedback amplifier, as follows:

$$E(S) = \frac{1}{\beta(S) + 1/A} \quad (17)$$

where $\beta(S)$ is the voltage transfer function of the feedback circuit 25, and is equal to T(S) of Eq. (11) in this case. Accordingly, when:

$$A >> |1/T(S)| \quad (18)$$

Eq. (17) reduces to:

$$E(S) \simeq 1/T(S) = 1 + \sqrt{(R_T C^2/C_T)S} \quad (19)$$

$$20 \log_{10}|E(j\omega)| \simeq 20 \log_{10}|1 + \sqrt{j(\omega/\omega_o)}| \text{ (dB)} \quad (20)$$

Since the right-hand side of Eq. (20) differs only in sign from the right-hand side of Eq. (13), it will be understood that this is just the equalization characteristic for the cable amplitude characteristic of Eq. (14).

As described above, while the two-port network of the present invention has a very simple structure having a single capacitance element and a single uniformly-distributed RC network, it is capable of providing a very precise apporoximation of the transmission characteristic of the coaxial cable. Owing to the facts that the structure is simple and that no inductance element is included, the two-port network is readily miniaturized by employing the integrated circuit technique. As a result, the influence of parasitic capacitance and inductance is minimized to permit the use at the ultrahigh frequency. Further, $\omega_c$ can be arbitrarily lowered by increasing the value of $R_T \times C_T$ so as to broaden the approximation band. While the embodiments in FIGS. 6 and 7 are shown to have only one stage, it is also possible to use them in a multistage construction as shown in FIG. 5. If the capacitance element 26 in the circuit in FIG. 7 is replaced with a variable capacitance element the circuit can be also used as the sloped AGC circuit.

What is claimed is:

1. A transmission line equalizer comprising:
a plurality of two-port networks each including
an input port,
an output port, one terminal of said output port being directly connected to one terminal of said input port,
a single one-port uniformly-distributed RC network connected between the other terminal of said input port and the other terminal of said output port, said single oneport uniformly-distributed RC network including
a dielectric plate having a uniform dielectric constant,
a resistive layer of a constant specific resistance formed on one major surface of said dielectric plate,
a conductive layer formed on the other major surface of said dielectric plate, and
first and second conductor strips disposed on said resistive layer at opposite edges of said dielectric plate, and
a capacitance element connected between said terminals of said output port, and
a plurality of buffer amplifiers connecting said plurality of two-port networks in cascade.

2. A transmission line equalizer comprising:
a two-port network including
an input port,
an output port, one terminal of said output port being directly connected to one terminal of said input port,
a single one-port uniformly-distributed RC network connected between the other terminal of said input port and the other terminal of said output port, said single one-port uniformly-distributed RC network including
a dielectric plate having a uniform dielectric constant,
a resistive layer of a constant specific resistance formed on one major surface of said dielectric plate,
a conductive layer formed on the other major surface of said dielectric plate, and
first and second conductor strips disposed on said resistive layer at opposite edges of said dielectric plate, and
a variable-capacitance diode connected between said terminals of said output port,
an amplifier having its input connected to said output port and
detecting means connected to the output of said amplifier for detecting the peak value of said amplifier output and adjusting the value of the capacitance of said variable-capacitance diode.

3. A transmission line equalizer as recited in claim 2 comprising a plurality of said two-port network, amplifier and detecting means combinations connected in cascade.

4. A transmission line equalizer comprising:
a two-port network including
an input port,
an output port, one terminal of said output port being directly connected to one terminal of said input port,
a single one-port uniformly-distributed RC network connected between the other terminal of said input port and the other terminal of said output port, said single one-port uniformly-distributed RC network including
a dielectric plate having a uniform dielectric constant,
a resistive layer of a constant specific resistance formed on one major surface of said dielectric plate,
a conductive layer formed on the major surface of said dielectric plate, and
first and second conductor strips disposed on said resistive layer at opposite edges of said dielectric plate, and
a capacitance element connected between said terminals of said output port, and
an amplifier having an input port,
said two-port network connected as a feedback circuit between said amplifier input and output, one terminal of said input and output ports being connected to the common terminal of said amplifier output, and said other terminal of said output port being connected to said amplifier input.

5. A transmission line equalizer as recited in claim 4 wherein said capacitance element is a variable capacitance element.

6. A transmission line equalizer as recited in claim 4 comprising a plurality of said amplifier and two-port network combinations connected in cascade.

* * * * *

UNITED STATES PATENT AND TRADEMARK OFFICE

CERTIFICATE OF CORRECTION

PATENT NO. : 3,904,992

DATED : September 9, 1975

INVENTOR(S) : Takuya IWAKAMI

It is certified that error appears in the above-identified patent and that said Letters Patent are hereby corrected as shown below:

IN THE SPECIFICATION:

Column 1, line 15 - delete $e^{-\alpha a \sqrt{s} \ell}$, and insert -- $e^{-\alpha \sqrt{s} \ell}$ -- line 48 - delete "(1)", and insert -- (i) --

Column 3, line 22 - delete "$\tanh \sqrt{R_T C_T , j\omega} \simeq 1$", and insert --

$$\tanh \sqrt{R_T C_T \cdot j\omega} \simeq 1$$

line 24 - delete "$\coth \sqrt{R_T C_T , j\omega} \simeq 1$", and insert --

$$\coth \sqrt{R_T C_T \cdot j\omega} \simeq 1$$

line 27 - between "$\omega$" and "$10\omega_c$", insert -- $\geqq$ -- line 43 - delete "trinuted", and insert -- tributed --

Column 4, line 2 - after "follows", insert -- : -- line 4 - delete " $\approx$ " and insert -- $\simeq$ -- line 42 - delete "the " and insert -- a --

Column 5, line 5 - delete "two-port network", and insert -- equalizer -- line 6 - delete "equalizer", and insert -- two-port network --

IN THE CLAIMS:

Column 5, line 60 - between "one" and "port", insert -- - --

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*